United States Patent [19]
Kobayashi et al.

[11] Patent Number: 5,649,248
[45] Date of Patent: Jul. 15, 1997

[54] DATA IMPRINTING/RECORDING APPARATUS FOR CAMERA

[75] Inventors: Yoshiaki Kobayashi; Takashi Suzuki, both of Tokyo, Japan

[73] Assignee: Olympus Optical Co., Ltd., Tokyo, Japan

[21] Appl. No.: 490,655

[22] Filed: Jun. 16, 1995

[30] Foreign Application Priority Data

Jun. 20, 1994 [JP] Japan ................... 6-137156

[51] Int. Cl.⁶ .................................. G03B 17/24
[52] U.S. Cl. .................................. 396/318
[58] Field of Search ................. 354/105, 106, 354/289.1, 289.11, 289.12; 396/310, 315, 318

[56] References Cited
FOREIGN PATENT DOCUMENTS 6-130482  5/1994  Japan.

*Primary Examiner*—David M. Gray
*Attorney, Agent, or Firm*—Frishauf, Holtz, Goodman, Langer & Chick

[57] ABSTRACT

In order that data indicating the allocation of ports for controlling light-emitting devices or the start year and the end year of a calendar can be arbitrarily rewritten, an imprinting control unit includes a calendar control unit for calculating the time and date, an imprinting output control unit for outputting imprinting patterns to an imprinting unit in order to perform data recording, and a memory. The calendar start year and end year data and the imprinting output patterns stored in the memory can be rewritten into arbitrary data through a communication line. This allows easy changes in the wiring to the imprinting unit and in the calendar specifications.

24 Claims, 14 Drawing Sheets

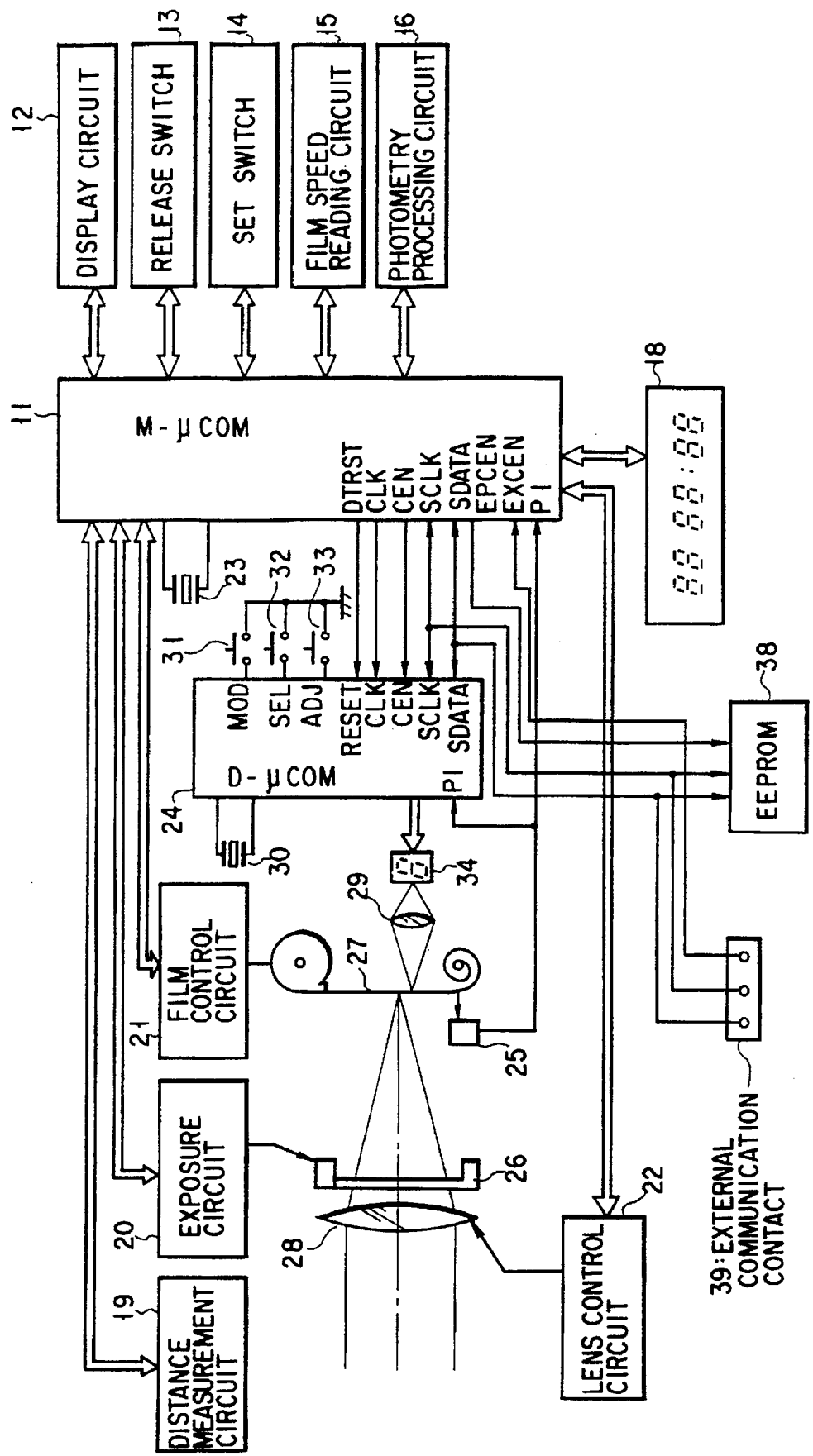
F I G. 2

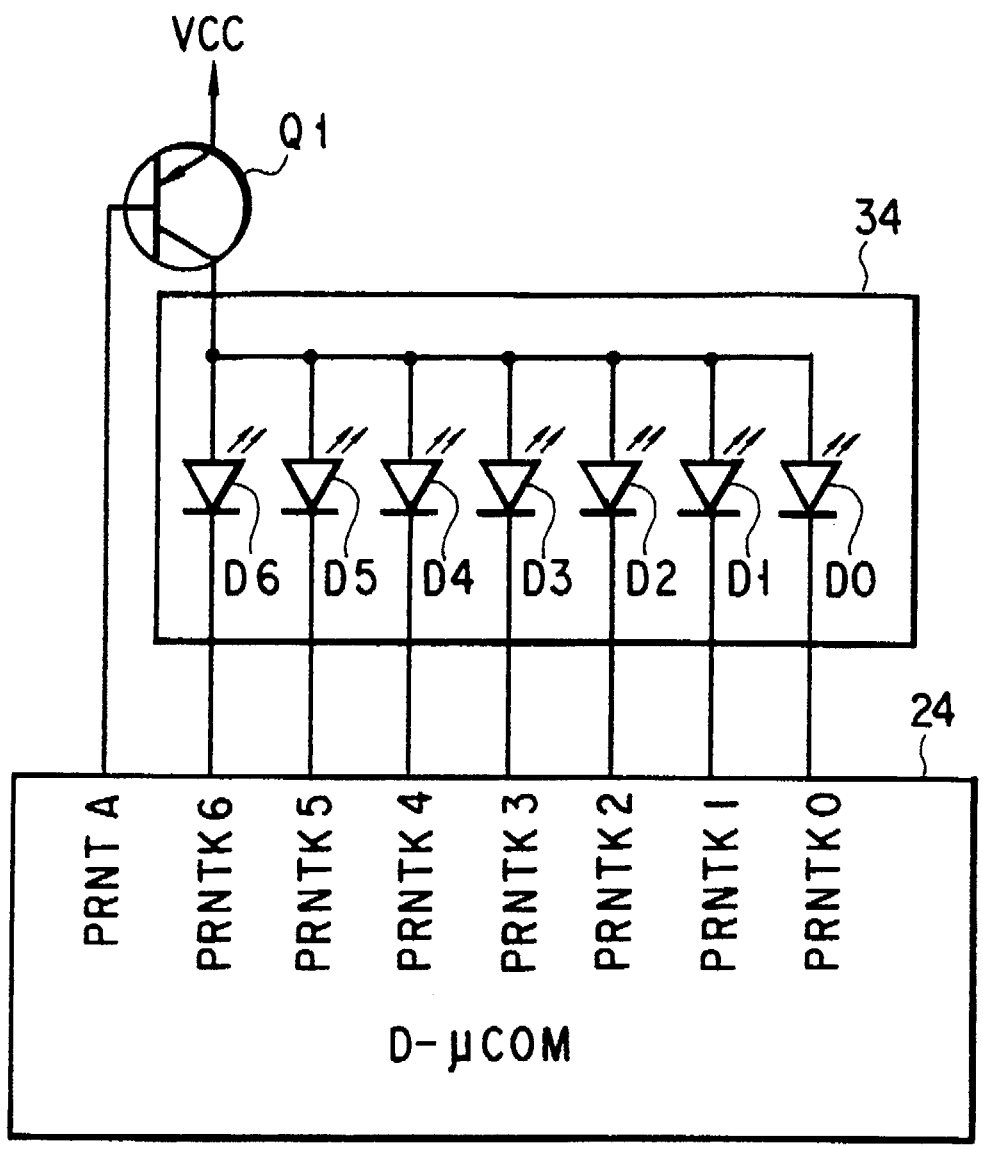
F I G. 5

| LIGHT-EMISSION PATTERN \ OUTPUT PORT | PRNT A | PRNTK 6 | PRNTK 5 | PRNTK 4 | PRNTK 3 | PRNTK 2 | PRNTK 1 | PRNTK 0 | |
|---|---|---|---|---|---|---|---|---|---|
| 0 | 0 | 0 | 0 | 1 | 0 | 0 | 0 | 0 | IMPRINTING PATTERN 1 |
| 1 | 0 | 1 | 1 | 1 | 1 | 1 | 0 | 0 | IMPRINTING PATTERN 2 |
| 2 | 0 | 0 | 1 | 0 | 0 | 0 | 1 | 0 | IMPRINTING PATTERN 3 |
| 3 | 0 | 0 | 1 | 0 | 1 | 0 | 0 | 0 | IMPRINTING PATTERN 4 |
| 4 | 0 | 1 | 0 | 0 | 1 | 1 | 0 | 0 | IMPRINTING PATTERN 5 |
| 5 | 0 | 0 | 0 | 0 | 1 | 0 | 0 | 1 | IMPRINTING PATTERN 6 |
| 6 | 0 | 0 | 0 | 0 | 0 | 0 | 0 | 1 | IMPRINTING PATTERN 7 |
| 7 | 0 | 0 | 1 | 1 | 1 | 1 | 0 | 0 | IMPRINTING PATTERN 8 |
| 8 | 0 | 0 | 0 | 0 | 0 | 0 | 0 | 0 | IMPRINTING PATTERN 9 |
| 9 | 0 | 0 | 0 | 0 | 1 | 0 | 0 | 0 | IMPRINTING PATTERN 10 |
| − | 0 | 1 | 1 | 0 | 1 | 1 | 1 | 1 | IMPRINTING PATTERN 11 |
|  | 1 | 1 | 1 | 1 | 1 | 1 | 1 | 1 | IMPRINTING PATTERN 12 |

F I G. 6

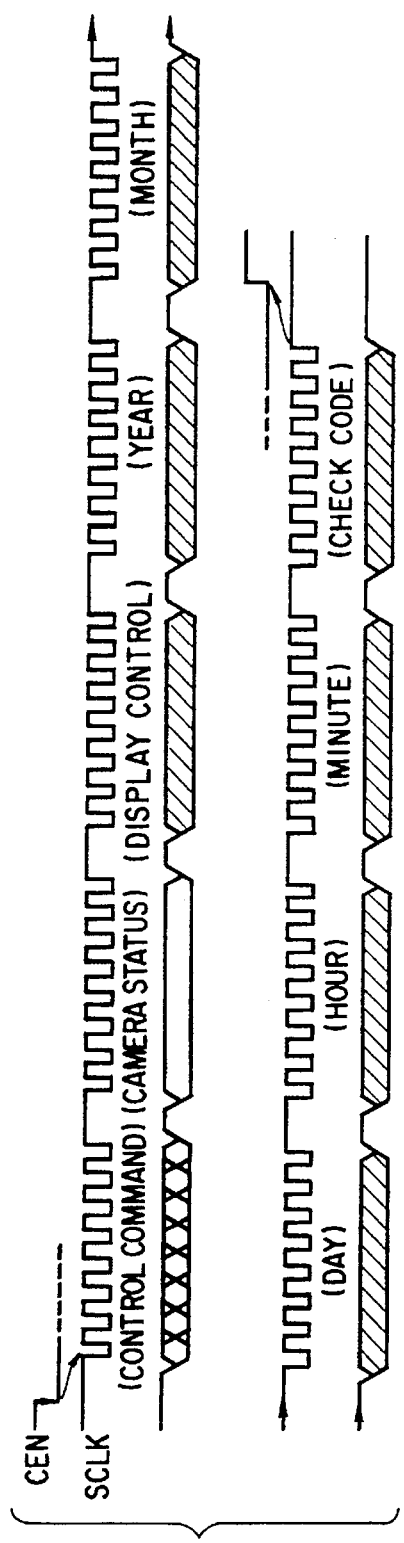
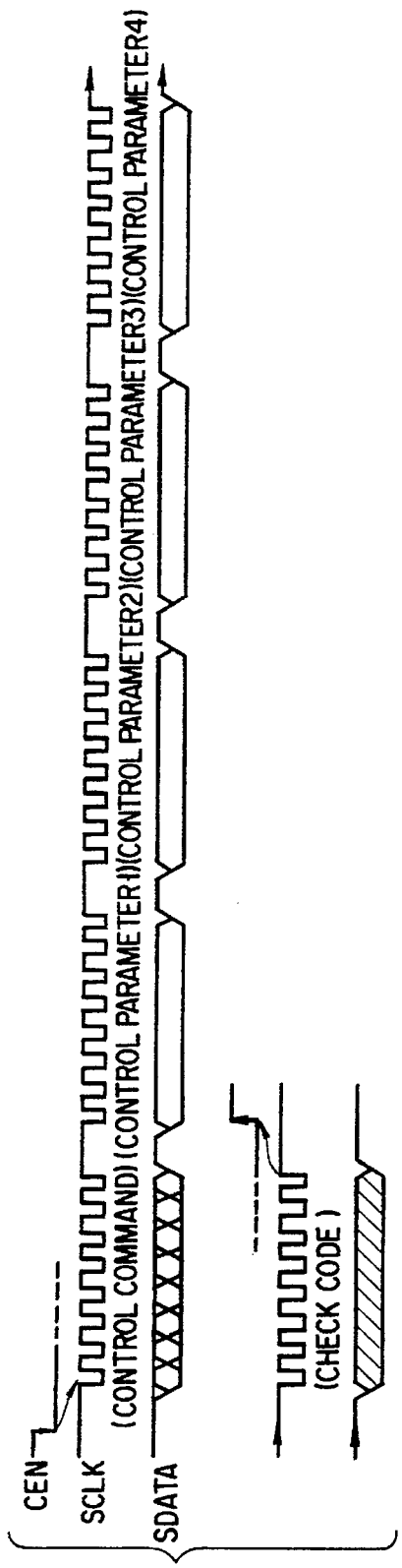
FIG. 7A
FIG. 7B

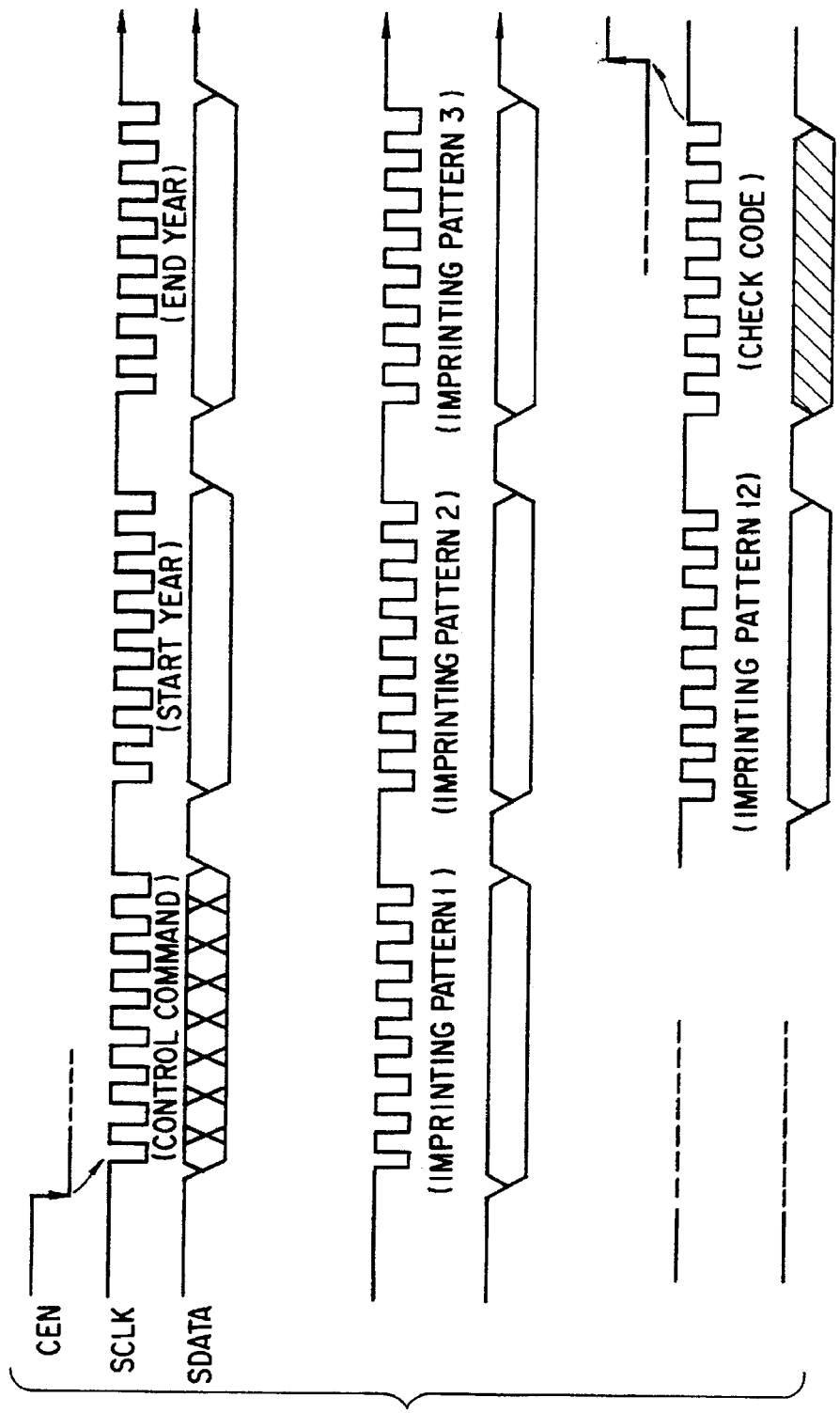

|   | 4-UPPER-BIT DATA | DISPLAY MODE |
|---|---|---|
| 1 | 0 0 0 0 | DISPLAY OFF MODE |
| 2 | 0 0 0 1 | 「YEAR」「MONTH」「DAY」DISPLAY MODE |
| 3 | 0 0 1 0 | 「MONTH」「DAY」「YEAR」DISPLAY MODE |
| 4 | 0 0 1 1 | 「DAY」「MONTH」「YEAR」DISPLAY MODE |
| 5 | 0 1 0 0 | 「DAY」「HOUR」「MINUTE」DISPLAY MODE |

F I G. 7E

|   | 4-LOWER-BIT DAY | ON/OFF MODE |
|---|---|---|
| 1 | 0 0 0 0 | INHIBIT ON/OFF |
| 2 | 0 0 1 0 | 88 88 [88] |
| 3 | 0 1 0 0 | 88 [88] 88 |
| 4 | 1 0 0 0 | [88] 88 88 |

F I G. 7F

|   | DATA CONTENTS | |
|---|---|---|
| CONTROL PARAMETER 1 | IMPRINTING REFERENCE TIME : STDTM | |
| CONTROL PARAMETER 2 | FILM SPEED COEFFICIENT : FSK | MEASUREMENT START TIMING : STRTM |
| CONTROL PARAMETER 3 | IMPRINTING DELAY TIME : TMDLY | |
| CONTROL PARAMETER 4 | IMPRINTING INTERVAL COEFFICIENT : ITVK | IMPRINTING FORMAT : PRFLAG |

F I G. 7G

DATA IMPRINTING/RECORDING APPARATUS FOR CAMERA

BACKGROUND OF THE INVENTION

1. Field of the Invention

The present invention generally relates to a camera and, more particularly, to a data imprinting/recording apparatus for a camera, which causes a light-emitting device to emit light in synchronism with the feed of a film to thereby imprint/record data such as the date on the surface of the film being fed.

2. Description of the Related Art

A technique has been conventionally proposed in which a light-emitting device is caused to emit light in synchronism with the feed of a film and thereby photographic information such as the date is imprinted on the surface of the film being fed.

As an example, Jpn. Pat. Appln. KOKAI Publication No. 6-130482 has disclosed an apparatus which is constituted by two microcomputers, i.e., a camera operation controller for controlling the operation of a camera and an imprinting controller having an imprinting control function and a timepiece or calendar function. These two controllers communicate with each other through a communication line connecting them, thereby imprinting predetermined data on the surface of a film.

It is unfortunate that this conventional technique aims to increase the reliability of communications and hence cannot change the allocation of ports for controlling a light-emitting device for performing imprinting and the start year or the end year of a calendar. That is, this conventional technique has the disadvantage of being unable to alter the port allocation and the calendar specifications.

SUMMARY OF THE INVENTION

It is, therefore, an object of the present invention to provide a new and improved data imprinting/recording apparatus for a camera in which data indicating the allocation of ports for controlling a light-emitting device and the start year and the end year of a calendar is arbitrarily rewritable and therefore the port allocation or the calendar specifications can be changed without changing the software of a microcomputer of an imprinting controller.

According to an aspect of the present invention, there is provided a data imprinting apparatus for a camera, comprising: a main microcomputer for controlling an operation of the camera; a data microcomputer having a temporary memory, the data microcomputer controlling imprinting of data onto a surface of a film; a communication line for performing communication between the main microcomputer and the data microcomputer; imprinting means connected to the data microcomputer and having a plurality of light-emitting segments, the imprinting means imprinting at least one of a numeral, a character, and a symbol on the surface of the film by combining the light-emitting segments; and an electrically rewritable nonvolatile memory connected to the main microcomputer to store pattern data necessary to imprint at least one of a numeral, a character, and a symbol by using the light-emitting segments of the imprinting means, wherein the main microcomputer transmits the pattern data to the temporary memory in the data microcomputer through the communication line, and the data microcomputer imprints at least one of a numeral, a character, and a symbol as data on the surface of the film by controlling the imprinting means by using the pattern data stored in the temporary memory.

According to another aspect of the present invention, there is provided a data recording apparatus for a camera, comprising: a camera operation control device for controlling an operation of the camera; and a data imprinting device having an imprinting unit consisting of a plurality of light-emitting elements, the data imprinting device imprinting data on a film, the camera operation control device comprising: first pattern data storage means for storing pattern data necessary to imprint at least one of a numeral, a character, and a symbol by using the light-emitting elements; and communication control means for transmitting the pattern data stored in the first pattern data storage means and an imprinting command signal, and the data imprinting device comprising: second pattern data storage means for temporarily storing the pattern data transmitted by the communication control means; and imprinting control means for controlling imprinting of data in response to the imprinting command signal transmitted by the communication control means and on the basis of the pattern data stored in the second pattern data storage means.

According to still another aspect of the present invention, there is provided a date recording apparatus for a camera, comprising: a main microcomputer for controlling an operation of the camera; a data microcomputer for controlling data imprinting, an oscillator for generating clock pulses being connected to the data microcomputer, and the data microcomputer having counting means for counting the output clock pulses from the oscillator; an electrically rewritable nonvolatile memory connected to the main microcomputer to store calendar data indicating a start year and an end year which represent a formable range of the date data; and a communication line for performing communication between the main microcomputer and the data microcomputer, wherein the main microcomputer transmits the calendar data stored in the nonvolatile memory to the data microcomputer through the communication line, the data microcomputer forms date data by using a count of the clock pulses obtained by the counting means and the calendar data, and the date imprinting/recording apparatus further comprises recording means connected to the data microcomputer to record the date data formed by the data microcomputer on a surface of a film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description of given above and the detailed description of the preferred embodiments given below, serve to explain the principles of the invention.

FIG. 2 is a block diagram showing the arrangement of a data imprinting/recording apparatus for a camera according to the first embodiment of the present invention;

FIG. 5 is a circuit diagram showing the circuit in FIG. 4 in more detail;

FIG. 6 is a view showing the relationship between the light emission pattern of the 7-segment LED 34 and the output data from output ports PRNTK0 to PRNTK6 and PRNTA of the D-μCOM 24;

FIGS. 7A to 7D are timing charts showing the communication method between an M-μCOM 11 and the D-μCOM 24;

FIGS. 7E and 7F are views showing the correspondence between the display control data and the display modes;

FIG. 7G is a view showing the correspondence between the control parameters and the data contents;

DETAILED DESCRIPTION OF THE PREFERRED EMBODIMENTS

Figure 1:
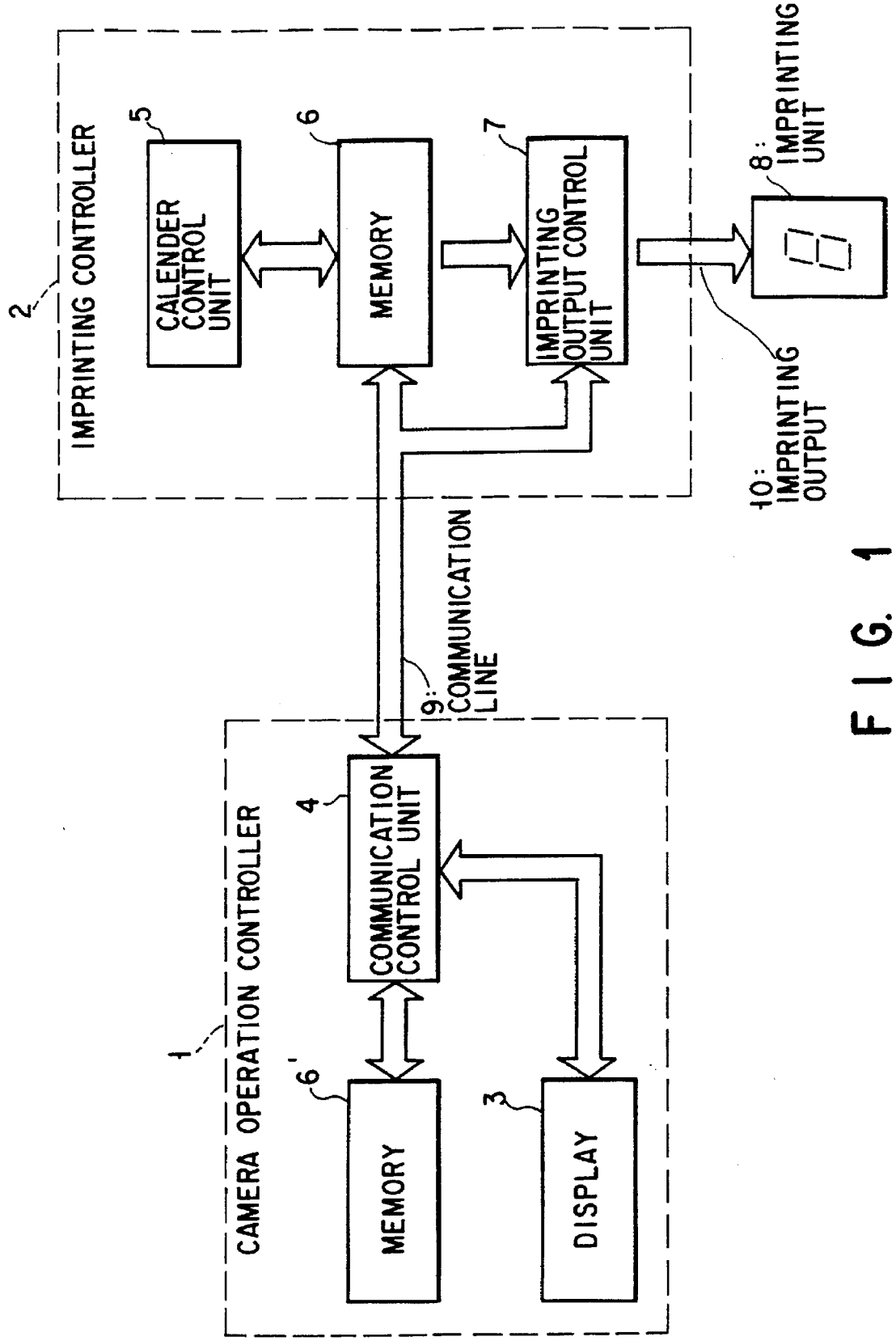
FIG. 1 is a block diagram for explaining the concept of a data imprinting/recording apparatus for a camera according to the present invention.

Reference will now be made in detail to the presently preferred embodiments of the invention as illustrated in the accompanying drawings, in which like reference characters designate like or corresponding parts throughout the several drawings.

Embodiments of the present invention will be described with reference to the accompanying drawings.

FIG. 1 is a block diagram for explaining the concept of a data imprinting/recording apparatus for a camera according to the present invention.

As illustrated in FIG. 1, in this data imprinting/recording apparatus for a camera of the present invention, a camera operation controller 1 and an imprinting controller 2 are connected by a communication line 9. The imprinting controller 2 performs data recording by outputting, through an imprinting output 10, imprinting patterns to an imprinting unit 8 for performing data recording.

The camera operation controller 1 has a display 3 and a memory 6'. The display 3 displays date-time data supplied from the imprinting controller 2 through the communication line 9. The memory 6' stores communication data via a communication control unit 4.

In this arrangement, the memory 6' stores data to be transmitted from the camera operation controller 1 to the imprinting controller 2 through the communication line 9 and data received from the imprinting controller 2 through the communication line 9.

The imprinting controller 2 includes a calendar control unit 5, an imprinting output control unit 7, and a memory 6. The calendar control unit 5 calculates the time and the date. The imprinting output control unit 7 outputs imprinting patterns to the imprinting unit 8 to perform data recording. The memory 6 stores the following various data: imprinting output data which the imprinting output control unit 7 outputs to the imprinting unit 8; calendar start year-end year data with which the calendar control unit 5 calculates the date, and the time-date data thus calculated; and data received through the communication line 9.

The calendar start year-end year data and the imprinting output patterns stored in the memory 6 can be rewritten into arbitrary data through the communication line 9. Consequently, it is possible to change the wiring to the imprinting unit 8 and the calendar specifications.

FIG. 2 shows the configuration of a data imprinting/recording apparatus for a camera according to the first embodiment of the present invention. Referring to FIG. 2, a main microcomputer (to be abbreviated as an M-μCOM hereinafter) 11 controls the sequence of the overall camera system and performs various arithmetic operations. This M-μCOM 11 is connected to a display circuit 12, a release switch 13, a set switch 14, a film speed reading circuit 15, a photometry processing circuit 16, a date display circuit 18, a distance measurement circuit 19, an exposure circuit 20, a film control circuit 21, and a lens control circuit 22, through their respective buses.

The M-μCOM 11 is also connected to an oscillator 23 for generating operating clocks for the M-μCOM 11, a data microcomputer (to be abbreviated as a D-μCOM hereinafter) 24 for the date, and a film movement detector 25.

The display circuit 12 displays the operating mode of the camera, the exposure data, and the frame number of a photographing film. The release switch 13 is a two-stroke switch: distance measurement is executed by ON of the first-stroke switch, and exposure is performed by ON of the second-stroke switch. The set switch 14 is used to set the operating mode of the camera. The film speed reading circuit 15 reads the DX code of a film and sends the corresponding SV value to the M-μCOM 11.

The date display circuit 18 displays the date data supplied from the D-μCOM 24.

The distance measurement circuit 19 sends, to the M-μCOM 11, data necessary to measure the distance to an object to be photographed. The exposure circuit 20 controls a lens shutter 26, which has functions of an aperture stop and a shutter, on the basis of a control signal from the M-μCOM 11. The film control circuit 21 performs automatic winding or rewind of a film 27 on the basis of a control signal from the M-μCOM 11. The lens control circuit 22 drives a taking lens 28 on the basis of a control signal from the M-μCOM 11, forming an image of an object to be photographed on the film 27. The film movement detector 25 sends a pulse signal corresponding to the moving amount of the film 27 to the M-μCOM 11 and the D-μCOM 24. On the basis of this pulse signal, the M-μCOM 11 controls automatic winding or rewind.

The D-μCOM 24 is a microcomputer for performing control to imprint the date data on the film 27. That is, the D-μCOM 24 imprints the date data on the film 27 by using a 7-segment LED 34 and an imprinting lens 29 in accordance with a control signal from the M-μCOM 11. This imprinting is done in synchronism with the pulse signal from the film movement detector 25.

An oscillator 30 generates operating clocks for the D-μCOM 24. By counting these clocks, the D-μCOM 24 forms imprinting data of "year", "month", "day", "hour", and "minute".

Of these data, the D-μCOM 24 calculates the year, the month, and the day by counting the clocks on the basis of the data indicating the calendar start year which is transmitted from an electrically rewritable nonvolatile memory (EEPROM) 38 (to be described later). Note that the year in which a power supply battery is loaded in the camera in the camera manufacturing factory or the like place and thereby the clock count is started is written in the EEPROM 38 as the calendar start year. Since the D-μCOM 24 is connected to a backup battery or a capacitor (neither is shown), the clock count is continued from the calendar start year.

Switches 31, 32, and 33 are a mode (MOD) switch, a selector (SEL) switch, and an adjust (ADJ) switch, respectively. By manipulating these three switches, the user can select the imprinting mode and modify the imprinting data. The imprinting mode selected state and the modified state are displayed on the date display circuit 18. Therefore, the user need only manipulate the three switches 31 to 33 while monitoring the display.

The operation of the D-μCOM 24 is controlled by five control signal lines CLK, CEN, SCLK, SDATA, and DTRST. The line CLK is used to send clocks from the M-μCOM 11 to the D-μCOM 24. The D-μCOM 24 need only execute the timer count operation while the M-μCOM 11 is not in operation. So the D-μCOM 24 executes a minimum necessary operation at a minimum necessary speed by using the operating clocks from the oscillator 30. This makes it possible to minimize the current consumption of the camera system as a whole. While the M-μCOM 11 is in operation, however, it is necessary for the D-μCOM 24 to perform the control for imprinting the date on the film 27 and the control based on the switch manipulation done by the user, in addition to the timer count operation. The result is that the processing speed is lowered if the D-μCOM 24 operates with the operating clocks from the oscillator 30.

It is therefore required of the D-μCOM 24 to operate with operating clocks supplied from the M-μCOM 11. Also, using the operating clocks from the M-μCOM 11 as operating clocks for high-speed operations of the D-μCOM 24 obviates the need for two oscillators as described in the first embodiment.

The line CEN is used by the M-μCOM 11 to send a communication request signal to the D-μCOM 24. The lines SCLK and SDATA are bidirectional signal lines for sending serial data. The line DTRST is a line which the M-μCOM 11 uses to generate a reset signal to the D-μCOM 24.

The EEPROM 38 is an electrically rewritable nonvolatile memory for storing the control values of the camera. Write and read of data with respect to the EEPROM 38 are done through a communicating line consisting of the lines SCLK, SDATA, and EPCEN described above. An external communication contact 39 is connected to the M-μCOM 11 through a communication line consisting of the lines SCLK, SDATA, and EXCEN. The contact 39 enables external data write and read to the EEPROM 38 via the M-μCOM 11. In this embodiment, the EEPROM 38 stores the calendar start year·end year data and the imprinting output pattern data, in addition to the control values of the camera. The M-μCOM 11 reads out these data and transmits the readout data to the D-μCOM 24.

Figure 3:
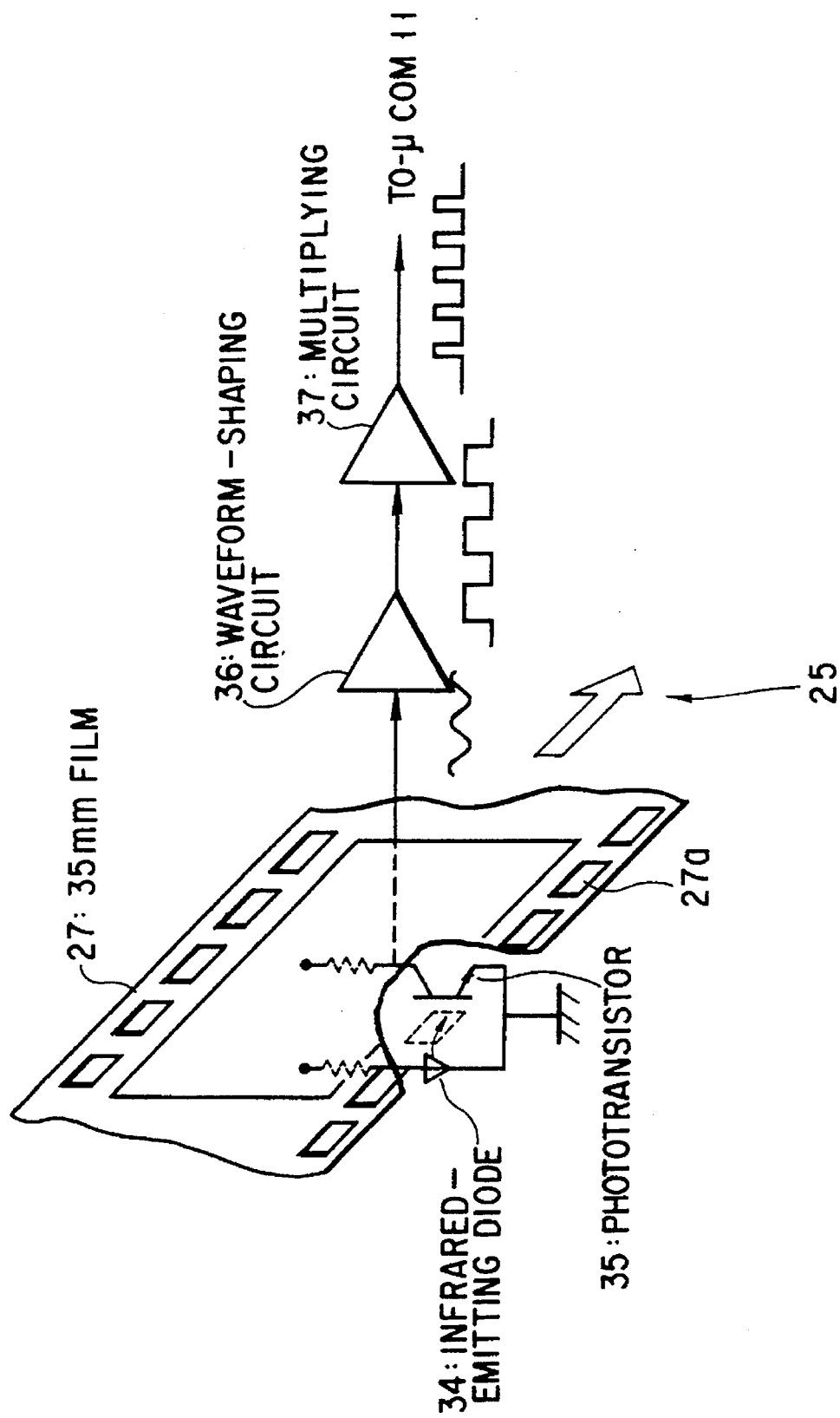
FIG. 3 is a view showing details of the arrangement of a film movement detector 25.

FIG. 3 shows details of the arrangement of the film movement detector 25.

Referring to FIG. 3, a photointerrupter constituted by an infrared-emitting diode 34 and a phototransistor 35 is so arranged that the infrared-emitting diode 34 and the phototransistor 35 oppose each other on the two sides of the film 27. When perforations 27a of the film 27 move, the photointerrupter outputs a signal corresponding to the movement of the film 27. This signal is waveform-shaped into a pulse signal by a waveform-shaping circuit 36 and converted into a pulse signal with a double period by a multiplying circuit 37. By counting the pulses of this pulse signal, the M-μCOM 11 and the D-μCOM 24 can detect the moving amount of the film.

Figure 4:
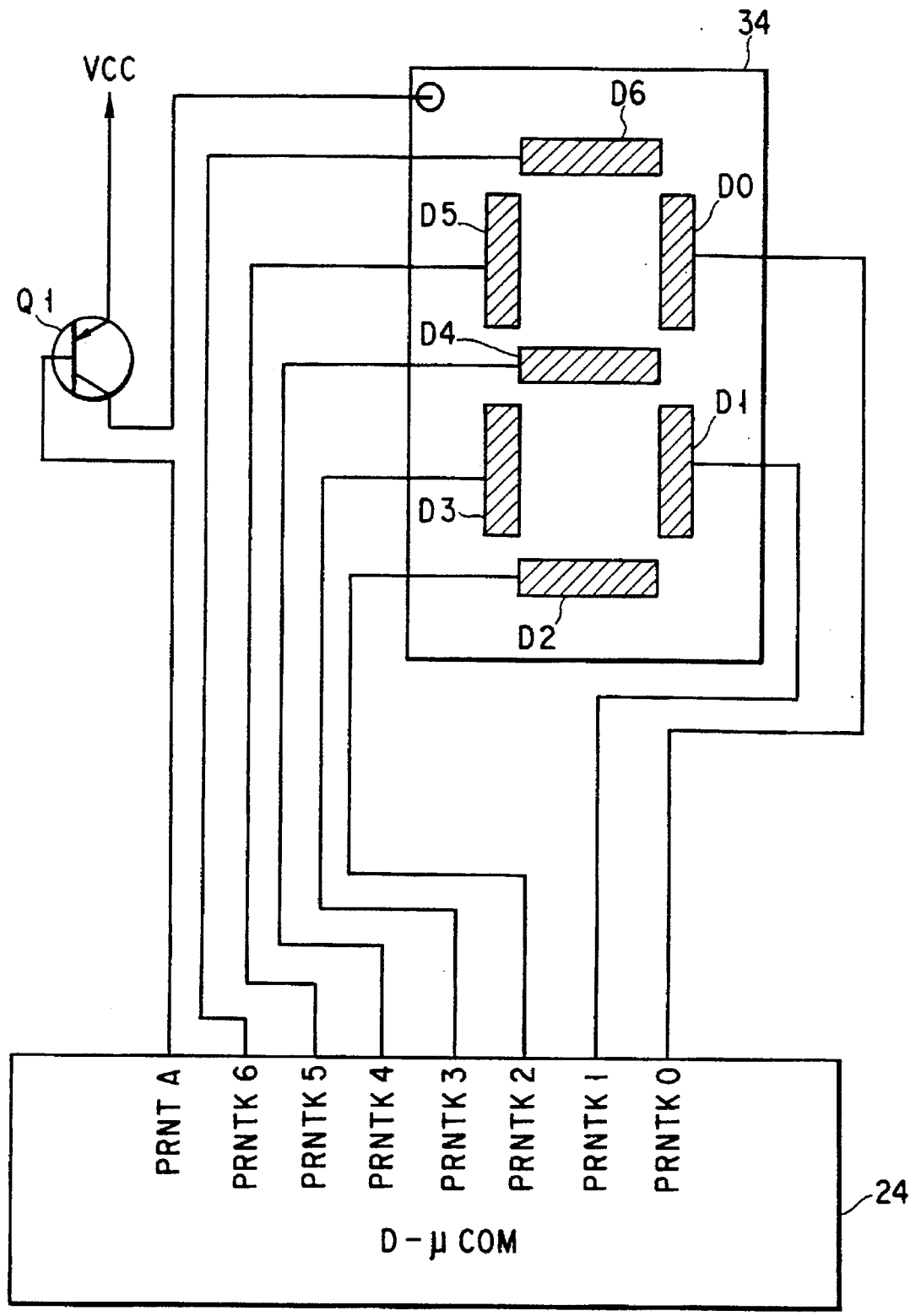
FIG. 4 is a view showing the wiring between a 7-segment LED 34 for imprinting and a D-μCOM 24.

FIG. 4 is a view showing the wiring between the imprinting 7-segment LED 34 and the D-μCOM 24. FIG. 5 is a detailed circuit diagram of FIG. 4.

As illustrated in FIGS. 4 and 5, the 7-segment LED 34 can display numerals by selectively making seven light-emitting diodes D0 to D6 emit light. As in FIG. 5, the 7-segment LED 34 used in this embodiment has an anode-common arrangement in which the anodes of the diodes D0 to D6 are connected to the collector of a pnp transistor Q1. The base of this transistor Q1 is connected to an output port PRNTA of the D-μCOM 24. That is, the transistor Q1 is turned on by setting the output from the output port PRNTA to low level "L". Consequently, a power supply VCC supplies a current to the common anode of the 7-segment LED 34.

On the other hand, the cathodes of the light-emitting diodes D0 to D6 are connected to output ports PRNTK0 to PRNTK6, respectively, of the D-μCOM 24. Of these output ports, only light-emitting diodes connected to ports which output low level "L" selectively emit light. That is, output data to the output ports PRNTK0 to PRNTK6 and PRNTA of the D-μCOM 24 is the imprinting pattern mentioned earlier.

FIG. 6 shows the relationship between the light emission pattern of the 7-segment LED 34 and the output data from the output ports PRNTK0 to PRNTK6 and PRNTA. In FIG. 6, "0" indicates low level "L", and "1" indicates high level "H".

According to FIG. 6, 8-bit data is required to form one light emission pattern. The 8-bit data corresponding to these light emission patterns are stored in the internal RAM (not shown) of the D-μCOM 24.

The method of communications between the M-μCOM 11 and the D-μCOM 24 will be described below with reference to the timing charts Shown in FIGS. 7A to 7D. Note that in FIGS. 7A to 7D, hatched portions indicate communications of data from the D-μCOM 24 to the M-μCOM 11, and other portions represent communications of data from the M-μCOM 11 to the D-μCOM 24.

Communication is started when the M-μCOM 11 switches the level of the line CEN from high level (Hi) to low level (Lo). Since a communication request is issued only from the M-μCOM 11, the M-μCOM 11 and the D-μCOM 24 have a master-slave relationship. After setting the line CEN to Lo, the M-μCOM 11 waits for a predetermined time and outputs a control command onto SDATA in synchronism with the signal SCLK. The waiting time is determined in consideration of the processing speed of the D-μCOM 24. The control command is used by the D-μCOM 24 to identify the communication mode. Therefore, regardless of the communication mode the control command is located at the leading position of communication data.

A communication mode A will be described first with reference to FIG. 7A.

As the first data, the M-μCOM 11 outputs a code corresponding to the communication mode A as a control command. The M-μCOM 11 then outputs data containing a code indicative of the status of the camera. The D-μCOM 24 can determine on the basis of this camera status data whether the M-μCOM 11 is in normal operation or is about to set a standby mode. When the M-μCOM 11 completely outputs these two data, the D-μCOM 24 outputs six necessary data to be displayed on the date display circuit 18 to the M-μCOM 11. After outputting these data, the D-μCOM 24 outputs a check code to end the data output. Upon receiving the check code, the M-μCOM 11 determines that the communication operation is completed, and changes the level of the line CEN from Lo to Hi. Any communication mode is ended when the M-μCOM 11 receives the check code.

The six data will be described below.

Display control data is for displaying the display method on the date display circuit 18.

Following this display control data, data indicative of "year", "month", "day", "hour", and "minute" are output. These five data give an indication of the contents of a clock counter which counts reference clocks generated inside the D-μCOM 24. The four upper bits of the display control data indicate which of the five data the M-μCOM 11 is to display on the display circuit 18 (i.e., indicate the display mode).

FIG. 7E shows the correspondence between the four upper bits and the display mode.

This data also shows an imprinting mode in which the D-μCOM 24 imprints the date data on the film 27. This display mode is changed in such a way as "1"→"2"→. . . "5"→"1" whenever the MOD switch 31 is turned on.

Data of the four lower bits will be described below.

This four-lower-bit data represents which of the six digits displayed on the date display circuit 18 the M-μCOM 11 is to turn on and off (i.e., indicates an ON/OFF mode).

FIG. 7F shows the correspondence between the data and the ON/OFF mode.

In FIG. 7F, it is assumed that each hatched digit is turned on and off.

This ON/OFF mode is changed in such a manner as "1"→"2"→"3"→"4"→"1" each time the SEL switch 32 connected to the D-μCOM 24 is switched on.

The user manipulates the SEL switch 32 to set a desired digit in the ON/OFF state and also manipulates the ADJ switch connected to the D-μCOM 24. Consequently, the D-μCOM 24 changes the contents of the clock counter corresponding to the digit turned on and off and outputs the changed data to the M-μCOM 11. This allows the user to change the date data while monitoring the date display circuit 18.

The six data and the check code sent from the D-μCOM 24 in the communication mode A are sequentially stored in internal memories BUF0 to BUF6 (not shown) of the M-μCOM 11 upon reception.

A communication mode B will be described below with reference to FIG. 7B.

As the first data, the M-μCOM 11 outputs a code corresponding to the communication mode B as a control command. The M-μCOM 11 then outputs four bytes of control parameters which the D-μCOM 24 requires to imprint the date data on the film 27. FIG. 7G shows the data contents of the control parameters.

The imprinting time of one digit of the date data (i.e., the light emission time of the 7-segment LED) is determined by an imprinting reference time STDTM of control parameter 1 and a film speed coefficient FSK in the upper nibble of control parameter 2. That is, STDTM×FSK=light emission time.

A measurement start timing STRTM in the lower nibble of control parameter 2 gives an indication of the position at which measurement of the moving velocity of the film 27 is started. When the M-μCOM 11 starts auto-loading of the film 27, the film movement detector 25 outputs a pulse signal.

The D-μCOM 24 starts the measurement of the film moving velocity at the timing at which the number of pulses indicated by STRTM are input after the first pulse signal is detected.

The detection of the moving velocity is inhibited for the period corresponding to the pulses STRTM because the moving velocity of the film 27 is unstable in the initial state of auto-loading.

The D-μCOM 24 detects the moving velocity of the film 27 by measuring the pulse interval of the pulse signal by using an internal timer. Assume this timer value is TFV. After detecting the film moving velocity, the D-μCOM 24 waits for an imprinting delay time of control parameter 3 and starts imprinting.

The position on the film 27 from which the imprinting data is imprinted is therefore determined by the data which is set by the STRTM and the imprinting delay time TMDLY. The interval between the numerical values to be imprinted is determined by an imprinting interval coefficient in the upper nibble of control parameter 4 and the TFV. That is, the date data is imprinted digit-by-digit at the time interval determined by TFV×ITVK. The imprinting format of control parameter 4 is used to determine whether the date data is imprinted from the lower digits or the upper digits. This is the data determined by the position of the 7-segment LED and the moving direction of the film 27.

A communication mode C will be described below with reference to FIG. 7C.

In this communication mode C, the M-μCOM 11 merely outputs a code corresponding to the communication mode C as a control code. The communication mode C is executed immediately before the M-μCOM 11 starts winding of a film. Therefore, the D-μCOM 24 can detect the winding timing by receiving this communication.

A communication mode D will be described below with reference to FIG. 7D.

In this communication mode D, the M-μCOM 11 outputs a code corresponding to the communication mode D as a control code and also outputs the start year data, the end year data, and imprinting patterns 1 to 12 shown in FIG. 6. Thereafter, upon receiving a check code from the D-μCOM 24, the M-μCOM 11 ends the communication mode D. Each of the start year data and the end year data is expressed by an 8-bit BCD code which represents the two lower figures of the year in A.D. That is, if the year is 1994, the four upper bits of the eight bits indicate "9", and the four lower bits indicate "4". If the value of the end year data is smaller than that of the start year, it is assumed that the two upper figures of the year in A.D. indicate "20".

More specifically, if the start year is 94 and the end year is 10, the start year is 1994 and the end year is 2010. In the communication mode D, the data transmitted to the D-μCOM 24 is stored in the RAM (not shown) of the D-μCOM 24.

The procedure of the operation of the M-μCOM 11 will be described below with reference to the flow chart in FIG. 8.

In step S101, the M-μCOM 11 performs initialization after the power supply is turned on. In step S102, the M-μCOM 11 starts outputting operating clocks necessary for the D-μCOM 24 to operate at a high speed. In step S103, the M-μCOM 11 sets two timers and commences timer count. One of the two timers is a display timer. This timer is initialized whenever the user manipulates any switch of the camera. If no switch manipulation is done for a predetermined time (e.g., 30 sec) and the timer counter overflows, the M-μCOM 11 is set in the standby mode to reduce the power consumption. The other timer is a 100-msec timer which is used as a sync signal for periodically receiving the date data from the D-μCOM 24.

In step S104, the M-μCOM 11 checks whether the display timer overflows. If the display timer overflows and is terminated, the processing of the M-μCOM 11 advances to step S105. In step S105, the M-μCOM 11 performs the communication in the communication mode A. In this step, the camera status data indicates that the M-μCOM 11 is about to set the standby mode. In step S105', the M-μCOM 11 performs communication check for the communication mode A. The contents of this communication check will be described later.

In step S106, the M-μCOM 11 stops outputting the operating clocks to the D-μCOM 24. In step S107, the M-μCOM 11 turns off all displays on the display circuit 12 in order to inform the user of the standby mode. In step S108, the M-μCOM 11 enables an interrupt, sets the standby mode, and halts the operation.

To restart the operation, the user need only manipulate any switch to generate an interrupt signal. When an interrupt signal is generated, the standby mode is canceled, and the M-μCOM 11 restarts the processing from step S102.

If the display timer does not overflow in step S104, the processing of the M-μCOM 11 advances from step S104 to step S109. In step S109, the M-μCOM 11 checks whether the 100-msec timer overflows. If the 100-msec timer overflows and is terminated, the processing of the M-μCOM 11 proceeds on to step S110. If the timer is not terminated, the processing of the M-μCOM 11 proceeds on to step S114 (to be described later).

In step S110, the M-μCOM 11 performs the communication in the communication mode A to receive the data required for a date display from the D-μCOM 24. In step S111, the M-μCOM 11 checks the communication contents. In step S112, the M-μCOM 11 displays the input data on the date display circuit 18 and also displays the data corresponding to the operating mode of the camera on the display circuit 12. In step S113, the M-μCOM 11 initializes the 100-msec timer to start timer count.

In the procedure from steps S109 to S113 described above, the displays on the date display circuit 18 and the display circuit 12 are updated in accordance with the operations of the M-μCOM 11 and the D-μCOM 24.

In step S114, the M-μCOM 11 receives the state of the set switch 14. In step S115, the M-μCOM 11 sets the operating mode of the camera corresponding to the state of the switch 14.

In step S116, the M-μCOM 11 receives a BV value as the luminance of an object to be photographed from the photometry processing circuit 16 and an SV value as the film speed from the film speed reading circuit 15. In step S117, the M-μCOM 11 calculates the film exposure time on the basis of the BV value and the SV value.

In step S118, the M-μCOM 11 checks the state of the first-release switch (1RSW) of the release switch 13. If the 1RSW is ON, the flow advances to the processing in step S119. If the 1RSW is OFF, the flow advances to the processing in step S104.

In step S119, the M-μCOM 11 initializes the display timer to commence timer count in order to prevent the standby mode from being set. In step S120, the M-μCOM 11 calculates the distance to the object on the basis of data from the distance measurement circuit 19.

In step S121, the M-μCOM 11 checks the state of the second-release switch (2RSW) of the release switch 13. If the 2RSW is ON, the flow advances to the processing in step S122. If the 2RSW is OFF, the flow advances to the processing in step S104. In step S122, the M-μCOM 11 performs the communication in the communication mode B. The M-μCOM 11 sends the data required for determining the conditions of date imprinting to the D-μCOM 24, in order that the D-μCOM 24 can make necessary preparations for imprinting during the exposure operation of the M-μCOM 11. Also, the M-μCOM 11 performs no communication check after the communication in the communication mode B in order to reduce the time lag from the switching on of the release switch 13 to the exposure.

In step S123, the M-μCOM 11 drives the taking lens 28 by using the lens control circuit 22 in accordance with the object distance. In step S124, the M-μCOM 11 drives the lens shutter 26 by using the exposure circuit 20 in accordance with the exposure time. When the exposure is completed, in step S125 the M-μCOM 11 performs the communication in the communication mode C prior to winding the film. The M-μCOM 11 performs no communication check after this communication in order to reduce the release time lag. In step S126, the M-μCOM 11 causes the film control circuit 21 to wind up one frame of the film and ends the series of operations.

Figure 8:
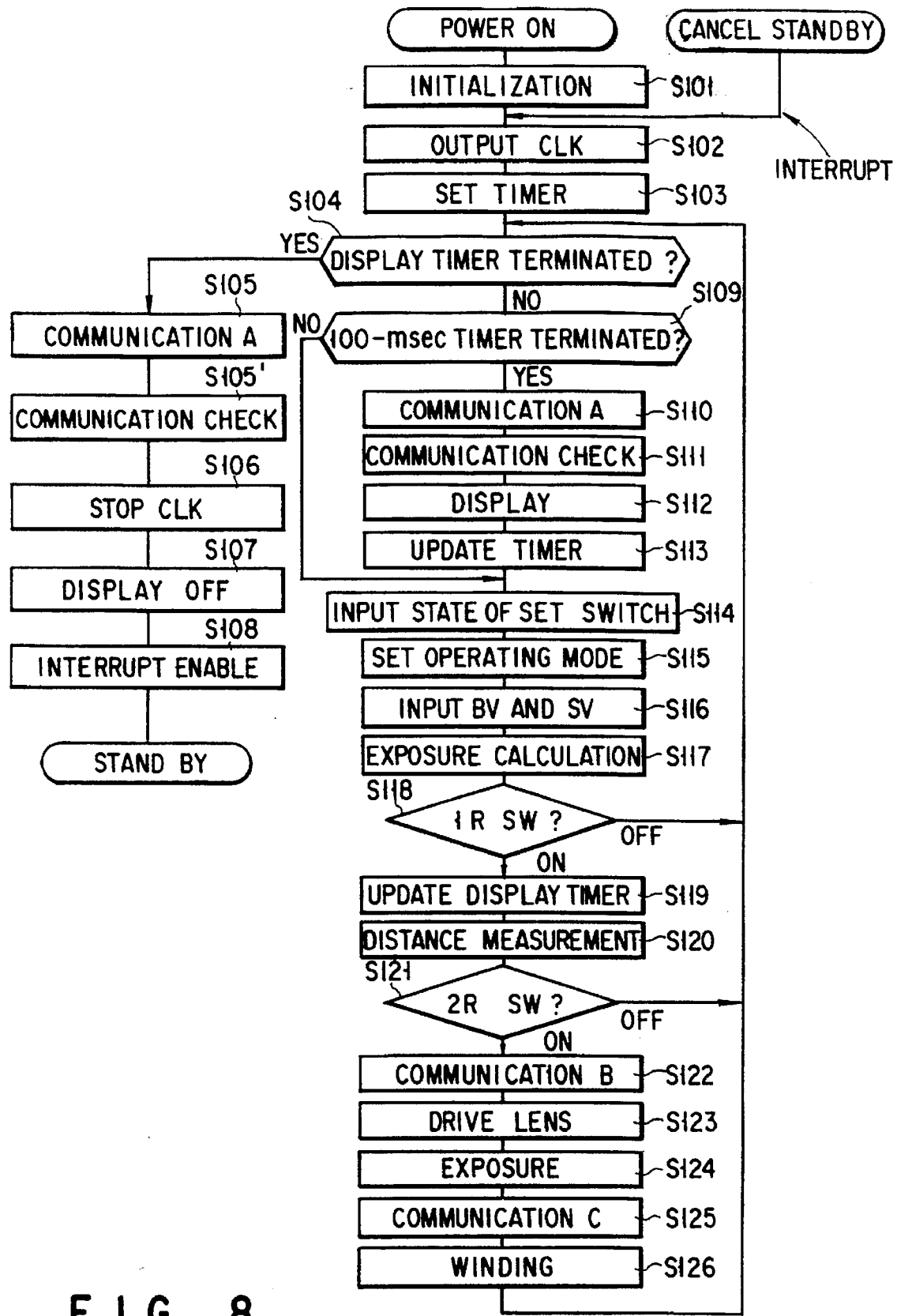
FIG. 8 is a flow chart for explaining the procedure of the operation of the M-μCOM 11.
Figures 9, 10:
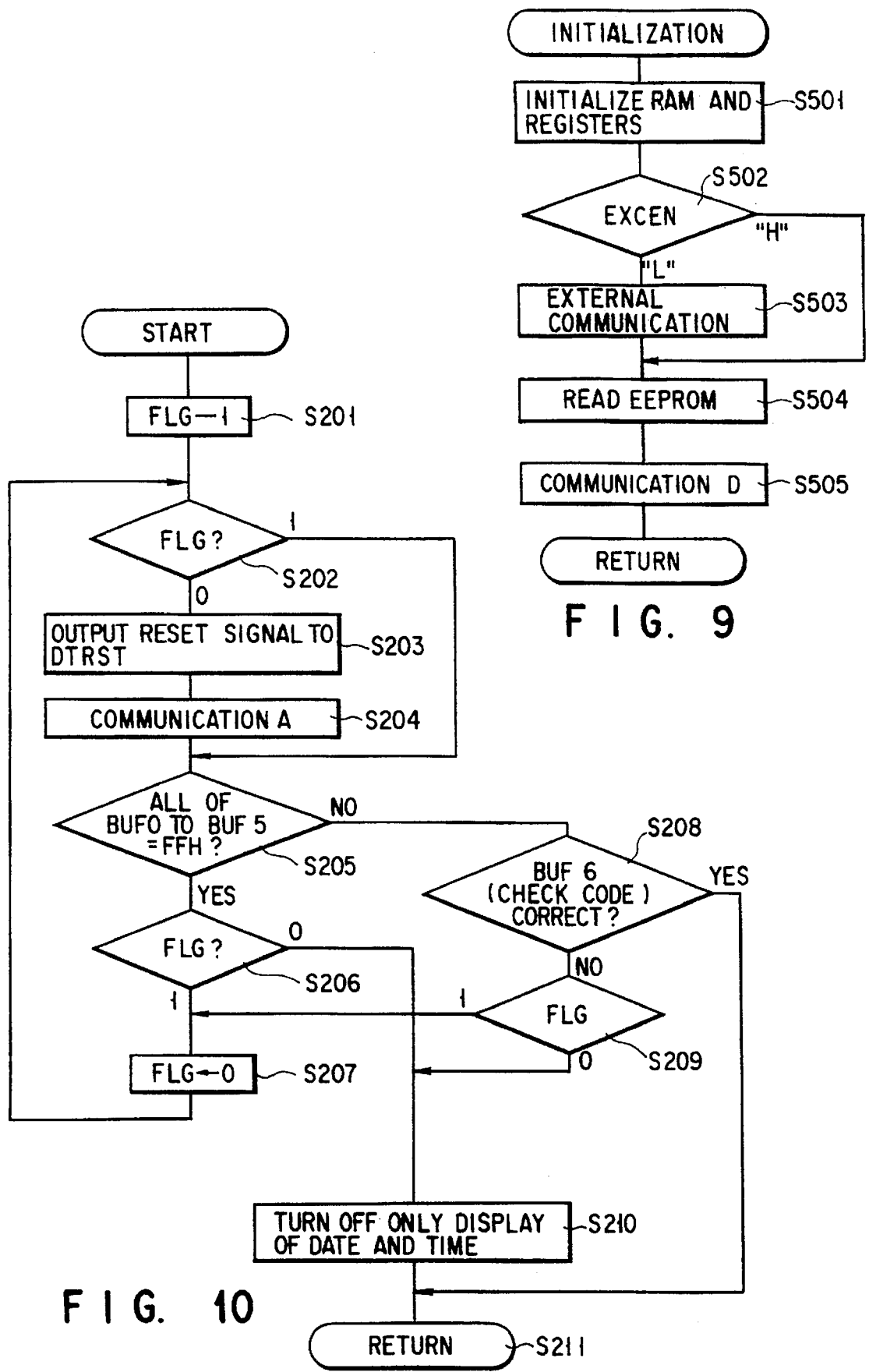
FIG. 9 is a flow chart showing the contents of initialization in step S101 in FIG. 8.
FIG. 10 is a flow chart for explaining the contents of communication check.

FIG. 9 is a flow chart showing the contents of the initialization in step S101 of FIG. 8. In step S501, the M-μCOM 11 initializes the internal RAM and registers. In step S502, the M-μCOM 11 checks the state of the input port EXCEN. If EXCEN is "L", this indicates that the external communication contact, FIG. 2, is connected to an external apparatus (not shown). Therefore, the flow passes on to the processing in step S503, and the M-μCOM 11 controls the communication with the external apparatus.

If the external apparatus requests a data write to the EEPROM 38, the M-μCOM 11 receives the data supplied from the external apparatus and the address of the EEPROM 38 designated by the external apparatus, and writes the received data in the designated address of the EEPROM 38. If EXCEN is "H", on the other hand, this represents that no external apparatus is connected to the external communication contact 39. Accordingly, the M-μCOM 11 proceeds on to the processing in step S504.

In step S504, the M-μCOM 11 reads out the data stored in the EEPROM 38 and transfers the readout data to the internal RAM of the M-μCOM 11. This data contains the start and end years of the calendar and imprinting patterns 1 to 12 described previously. Thereafter, in order to perform the communication mode D mentioned earlier, the M-μCOM 11 executes "COMMUNICATION D" in step S505 and ends the procedure.

The contents of the communication check performed by the M-μCOM 11 will be described below with reference to the flow chart in FIG. 10. In step S201, the M-μCOM 11 performs initialization by setting FLG=1 as a flag. In step S202, the M-μCOM 11 checks the FLG. If FLG=1, the flow advances to the processing in step S205. In step S205, the M-μCOM 11 checks whether all values of the internal memories BUF0 to BUF5 which store the data received in the communication A are FFH. If the all values are FFH, the flow advances to the processing in step S206. If at least one of the values is not FFH, the flow advances to the processing in step S208.

In step S206, the M-μCOM 11 checks the FLG. If FLG=1, this means that this is the first check on the communication data. Therefore, the M-μCOM 11 sets FLG=0 in step S207 and returns to the processing in step S202. Since, however, FLG=0 in step S202, the flow advances to the processing in step S203.

In step S203, the M-μCOM 11 outputs a reset signal to the control line DTRST for a predetermined time, thereby resetting the D-μCOM 24. In step S204, the M-μCOM 11 performs the communication A.

Thereafter, the M-μCOM 11 again checks the communication data in step S205. If the M-μCOM 11 again determines that all values of BUF0 to BUF5 are FFH, the flow advances to the processing in step S210 since this time FLG=0 in step S206. In step S210, the M-μCOM 11 determines that the D-μCOM 24 is unable to perform communication or the communication line is not connected. Accordingly, the M-μCOM 11 turns off the date-time display on the LCD 18 and returns to the main flow (in step S211).

If the M-μCOM 11 determines in step S205 that at least one of the values of BUF0 to BUF5 is not FFH, the flow advances to the processing in step S208. In step S208, the M-μCOM 11 checks whether BUF6 (check code) has a predetermined value. If this check code has the predetermined value (correct), the M-μCOM 11 determines that the communication is normally done and the D-μCOM 24 is operating normally, and returns to the main flow in step S211.

If the value of BUF6 is not the predetermined value (incorrect) in step S208, the M-μCOM 11 proceeds on to the processing in step S209. If FLG=1 in step S209, the M-μCOM 11 advances to step S207 to set FLG=0 and further advances to the processing in step S203, since FLG=0 in step S202, thereby resetting the D-μCOM 24. Thereafter, the M-μCOM 11 reexecutes the communication and checks the communication data. If FLG=0 in step S209, this indicates that the reset to the D-μCOM 24 and the communication have already been done. Therefore, as in the previous procedure, the M-μCOM 11 turns off the date-time display in step S210 and returns in step S211.

Figure 11:
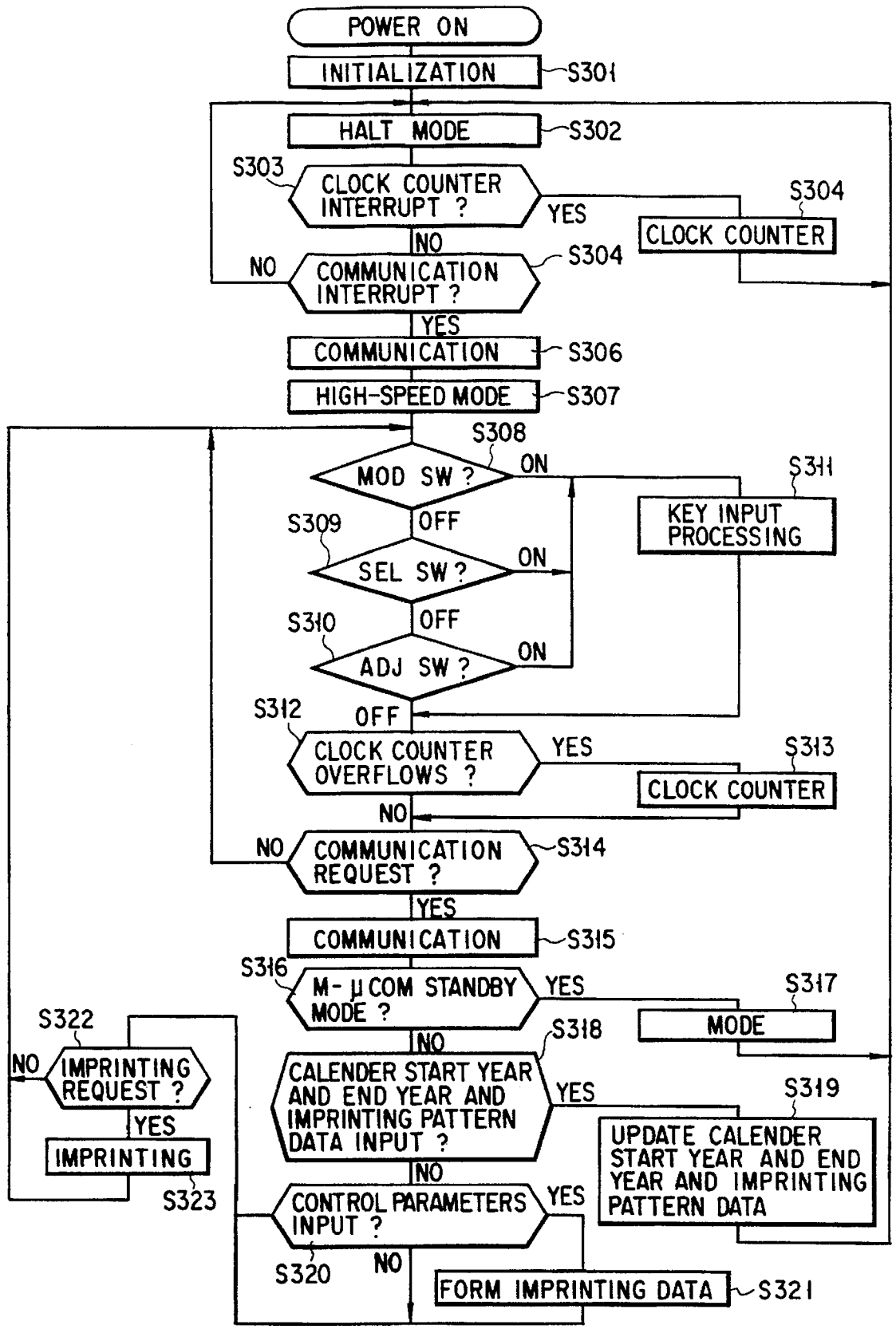
FIG. 11 is a flow chart showing the procedure of the operation of the D-μCOM 24.

The operation of the D-μCOM 24 will be described below with reference to the flow chart in FIG. 11.

In step S301, the D-μCOM 24 performs initialization after being reset upon turning on of the power supply. In this initialization, the D-μCOM 24 inputs predetermined data to the clock counter used as imprinting data. In step S302, the D-μCOM 24 is set in a halt mode. During the halt mode, the D-μCOM 24 can operate only a clock timer for counting clocks of the oscillator 30 and an interrupt function. The clock timer overflows at intervals of 1 sec. This overflow is one of the interrupt signals.

The date data, therefore, is formed by counting up the five clock counters (minute, hour, day, month, and year) by using this interrupt signal as a reference clock. Accordingly, when an interrupt occurs due to the clock timer, the clock timer is updated by the processing in steps S303 and S304. In "CLOCK COUNTER" in step S304, the D-μCOM 24 calculates, e.g., the year, the month, and the day by using the data indicative of the calendar start year (similar calculations are done in step S313 to be described later). When this counter update is completed, the flow returns to step S302, and the D-μCOM 24 is set in the halt mode.

When in operation, the M-μCOM 11 periodically communicates with the D-μCOM 24, i.e., changes the level of the line CEN from Hi to Lo. A communication interrupt occurs due to this change in the line CEN, so the D-μCOM 24 proceeds on to the processing in steps S305 and S306.

In step S306, the D-μCOM 24 performs processing corresponding to each individual communication mode. In step S307, the D-μCOM 24 uses clocks supplied from the M-μCOM 11 as the operating clocks. Consequently, the processing speed of the D-μCOM 24 is increased.

In the processing in steps S308, S309, and S310, the D-μCOM 24 checks the states of the three switches (MOD, SEL, and ADJ) 31, 32, and 33, respectively. If any of the switches is manipulated, the D-μCOM 24 advances to the processing in step S311, performing processing corresponding to the manipulated switch.

That is, if the MOD switch 31 is operated, the D-μCOM 24 changes the imprinting mode and the display control data to be supplied to the M-μCOM 11. If the SEL switch 32 is operated, the D-μCOM 24 sets the date data modify mode and selects a figure to be modified. To turn on and off the selected figure, the D-μCOM 24 changes the display control data. If the ADJ switch 33 is operated, the D-μCOM 24 modifies the contents of the clock counter corresponding to the chosen figure.

In step S312, the D-μCOM 24 checks whether the clock timer overflows. If the clock timer overflows, the D-μCOM 24 executes the processing in step S313 in order to update the clock counter. In step S314, the D-μCOM 24 checks from the state of the line CEN whether a communication request is issued. If the line CEN is Hi, the flow advances to the processing in step S308. If the line CEN is Lo, the flow advances to the processing in step S315. In step S315, the D-μCOM 24 performs processing corresponding to each individual communication mode.

In step S316, the D-μCOM 24 determines the operating state of the M-μCOM 11 from the code indicating the status of the camera. If the M-μCOM 11 is about to set the standby mode, the D-μCOM 24 advances to the processing in step S317 to stop using the clocks supplied from the M-μCOM 11. If this is the case, the D-μCOM 24 lowers the processing speed by the use of the operating clocks from the oscillator 30, thus reducing the consumption power.

If the standby mode is not set in step S316, the D-μCOM 24 advances to the processing in step S318. If the calendar start and end years and the imprinting patterns 1 to 12 are input by the communication mode D, the D-μCOM 24 passes on to the processing in step S319. In step S319, the D-μCOM 24 updates the calendar start and end years and imprinting patterns 1 to 12 already stored in the D-μCOM 24 and returns to the processing in step S302.

As described above, in the present invention the data of output patterns is transmitted from the EEPROM. Therefore, even if a different wiring pattern is used in the imprinting unit 8, the same D-μCOM 24 can be used only by rewriting the output patterns to be stored in the EEPROM.

If the control parameters are input by the communication mode B in step S320, the D-μCOM 24 advances to the processing in step S321. In step S321, the D-μCOM 24 calculates the product of STDTM and FSK contained in the control parameters in order to control the light emission time of the 7-segment LED. Assume this value is TON.

Figure 13:
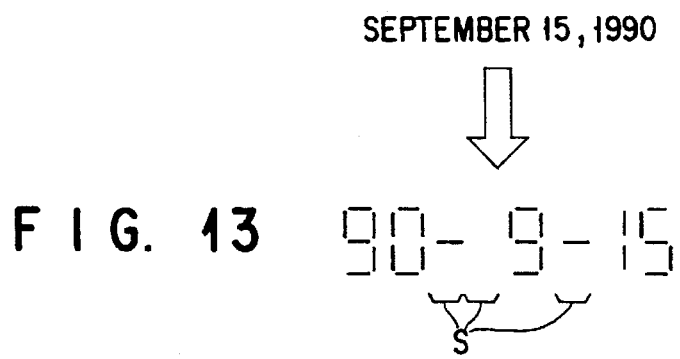
FIG. 13 is a view showing a practical example of data except for numerals.

Subsequently, in accordance with the imprinting mode the D-μCOM 24 reads out the value of the clock counter corresponding to the imprinting date data and converts the readout value into data for turning on the 7-segment LED. This data is 8-byte data (DATA1 to DATA8) containing numerals and some other data. FIG. 13 shows a practical example of the data containing numerals and some other data. To imprint "September 15, 1990", for example, portions "-" indicated by s in FIG. 13 also are handled as data for turning on the LED. Note that FIG. 13 shows the way the date is displayed in Japan.

In step S322, the D-μCOM 24 checks whether the M-μCOM 11 issues an imprinting request in the communication mode C. If the request is issued, the D-μCOM 24 executes a subroutine "IMPRINTING" in step S323.

Figure 12:
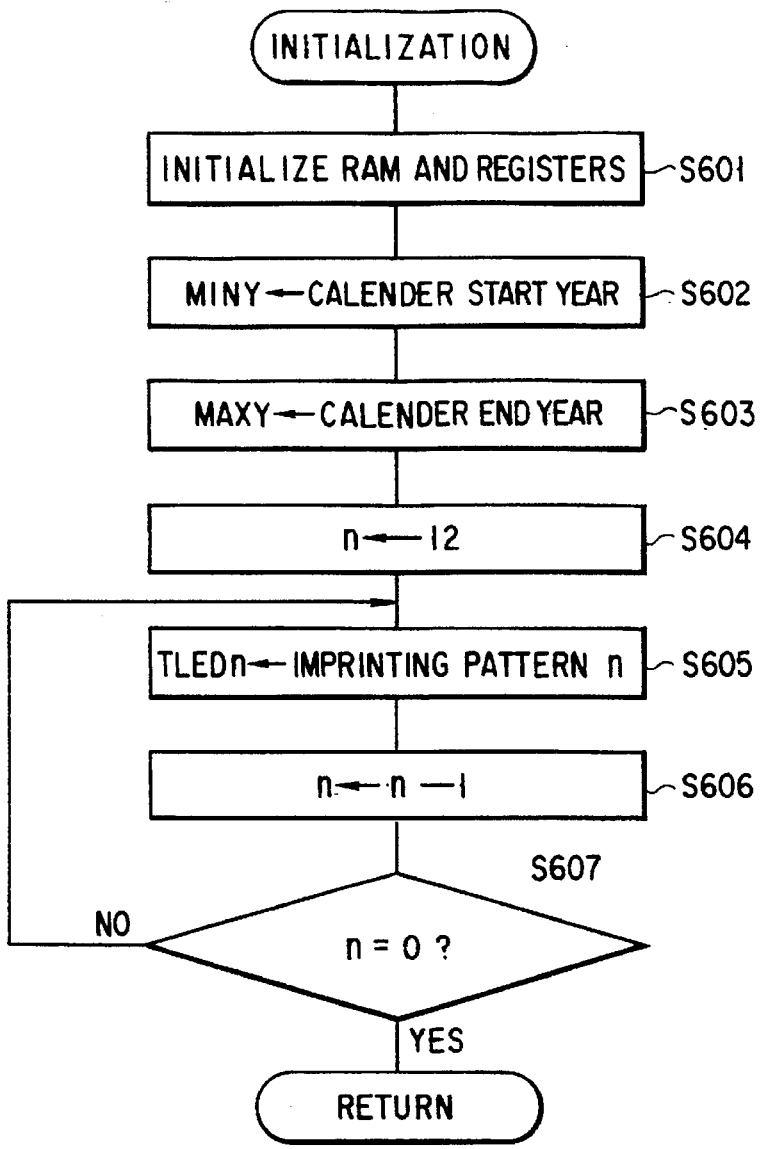
FIG. 12 is a flow chart showing initialization in step S301 in FIG. 11.

The initialization in step S301 in FIG. 11 will be described below with reference to the flow chart in FIG. 12. In step S601, the D-μCOM 24 initializes the internal RAM and registers. In step S602, the D-μCOM 24 stores the initial value of the calendar start year in MINY of the RAM. In step S603, the D-μCOM 24 stores the initial value of the calendar end year in MAXY in the RAM.

In step S604, the D-μCOM 24 sets 12 in a counter n and proceeds on to the processing in step S605. In step S605, the D-μCOM 24 stores imprinting pattern n referred to by the counter n into TLEDn of the RAM. If, for example, this imprinting pattern n is n=5, this indicates the initial value of imprinting pattern 5.

In step S606, the D-μCOM 24 decrements the counter n and advances to the processing in step S607. In step S607, the D-μCOM 24 checks the value of the counter n. If n=0, the flow returns to the main flow. If the value is not n=0, the D-μCOM 24 returns to the processing in step S605.

That is, D-μCOM 24 repetitively executes the processing in steps S605 to S607 twelve times until n=12 becomes n=0, and stores the initial values of imprinting patterns 1 to 12 in TLED1 to TLED12 during the series of operations. These operations are done in order to allow the calendar function and the imprinting function to operate with the initial values even if the communication mode D is not executed.

Figure 14:
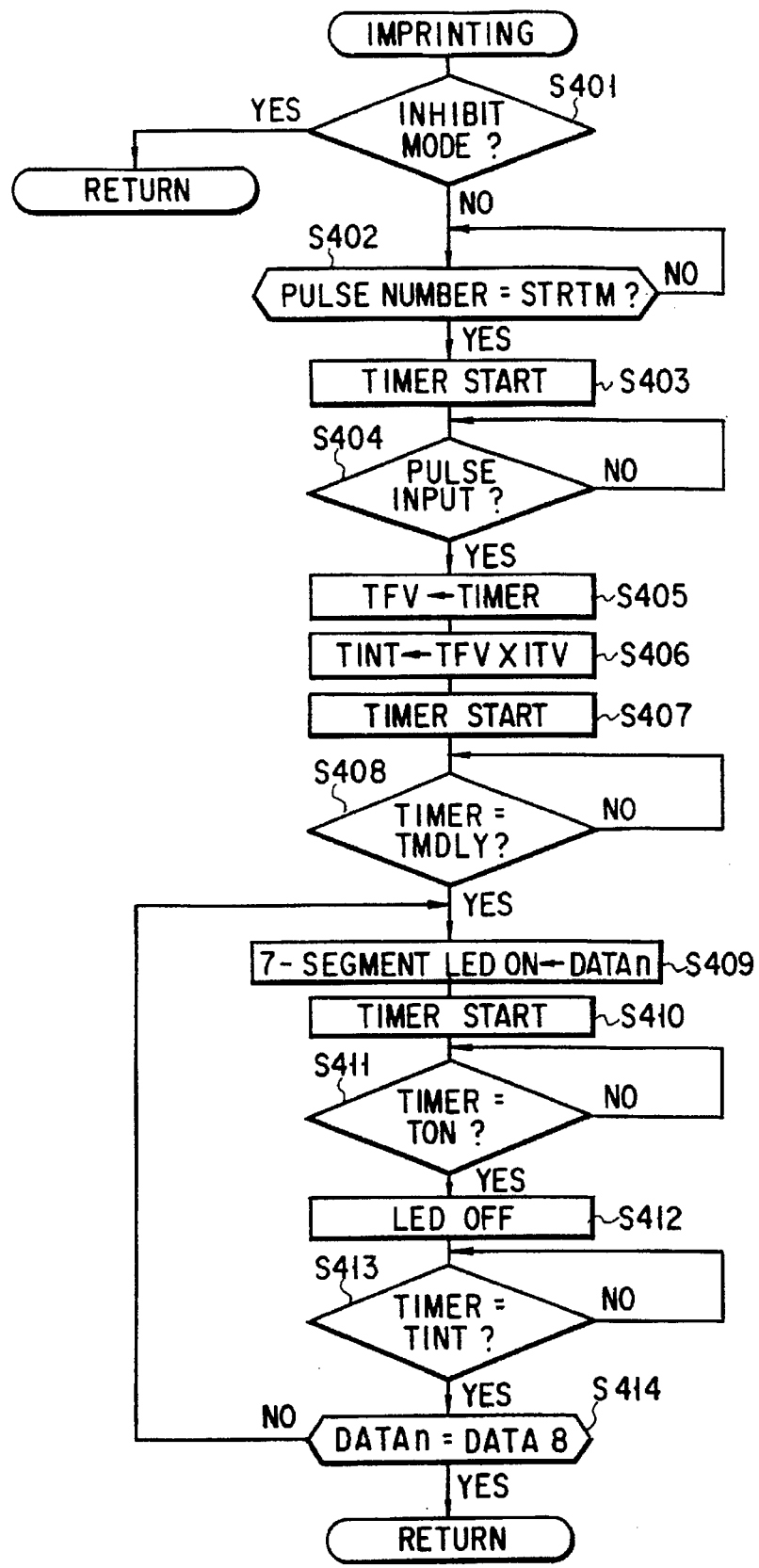
FIG. 14 is a flow chart showing a subroutine "IMPRINT-ING".

The subroutine "IMPRINTING" will be described below with reference to FIG. 14.

In step S401, the D-μCOM 24 checks whether an imprinting inhibit mode is set. If the inhibit mode is set, the flow returns to the main routine. When the M-μCOM 11 starts winding the film 27, the film movement detector 25 outputs a pulse signal.

In step S402, prior to detecting the film moving velocity the D-μCOM 24 skips a predetermined number (STRTM) of pulses of the pulse signal. In step S403, the D-μCOM 24 initializes the timer counter to start count-up in order to detect the film moving velocity. In step S404, the D-μCOM 24 waits until the pulse signal is output next. If the pulse signal is detected in step S404, the D-μCOM 24 proceeds on to the processing in step S405 to fetch the value of the timer counter as TFV. TFV is the time data corresponding to the moving velocity of the film 27.

In step S406, the D-μCOM 24 multiplies TFV by the coefficient (ITVK) to obtain TINT. TINT determines the interval between numerical values (or symbols) to be imprinted.

The D-μCOM 24 then sets the wait time before turning on the 7-segment LED 34.

By the processing in steps S407 and S408, imprinting is delayed for a predetermined time (TMDLY). In step S409, the D-μCOM 24 outputs the data for turning on the 7-segment LED 34 from the output port of the D-μCOM 24. Consequently, imprinting of one numeral is commenced.

In step S410, the D-μCOM 24 initializes the timer counter and starts count-up. In step S411, the D-μCOM 24 waits for the imprinting time (TON). In step S412, the D-μCOM 24 turns off the LED 34 to complete the imprinting of one numeral.

In step S413, the D-μCOM 24 waits until timer counter= TINT, thereby forming an interval to the next numeral. Note that although in this case actually timer counter=TINT− TON, no problem arises since TINT>>TON. In step S414, the D-μCOM 24 checks whether imprinting of the 8-byte data is completed.

By the processing in steps S409 to S414, the data DAT1 to DAT8 are sequentially imprinted on the film 27.

As has been described in detail above, in the data imprinting/recording apparatus for a camera according to the present invention, three states of the D-μCOM 24, i.e., the connected, unconnected, and runaway states are detected in the communications between the M-μCOM 11 and the D-μCOM 24 by using the contents of the communication data and the check codes. If the unconnected or runaway state is detected, the date display on the LCD is turned off. Furthermore, if the detected state is runaway, a reset signal is generated to the D-μCOM 24.

According to the embodiment of the present invention as described above, the following arrangements can be attained.

(1) A data imprinting/recording apparatus for a camera which has a calendar function and data recording means for recording data on the surface of a film, comprising storage means for storing output patterns from the data recording means in order to record the data on the film surface and storing control data for controlling the calendar function, wherein the contents stored in the storage means are rewritable by communications done by communicating means for performing communications between the data imprinting/ recording apparatus and an external device.

(2) A data imprinting/recording apparatus for a camera described in item (1) above, wherein the control data for controlling the calendar function is the start year or the end year of a calendar.

(3) A data imprinting/recording apparatus for a camera described in item (1) above, further comprising second storage means for storing data for rewriting the contents of the storage means.

(4) A data imprinting/recording apparatus for a camera described in item (3) above, wherein the communicating means can also control communications of the data imprinting/recording apparatus with an external device, and the contents of the second storage means can be arbitrarily rewritten by communications from an external device.

(5) A data imprinting/recording apparatus for a camera described in item (3) above, wherein the second storage means is an electrically rewritable nonvolatile memory.

(6) A data imprinting/recording apparatus for a camera which has data recording means for recording data on the surface of a film, comprising storage means for storing output patterns from the data recording means in order to record the data on the film surface, wherein the contents stored in the storage means are rewritable by communications done by communicating means for performing communications between the data imprinting/recording apparatus and an external device.

(7) A data imprinting/recording apparatus for a camera which has a calendar function and data recording means for recording data on the surface of a film, comprising storage means for storing control data for controlling the calendar function, wherein the contents stored in the storage means are rewritable by communications done by communicating means for performing communications between the data imprinting/recording apparatus and an external device.

In the data imprinting/recording apparatus for a camera described in item (1) above, the calendar specifications or the wiring in an imprinting unit can be readily changed. In the data imprinting/recording apparatus for a camera described in item (2) above, the calendar function can be easily controlled by using the calendar start year or end year data. In the data imprinting/recording apparatus for a camera described in item (3) above, data for rewriting can be stored in the second storage means. In the data imprinting/recording apparatus for a camera described in item (4) above, data can be rewritten via the communicating means for communicating with an externally connected device. Consequently, it is readily possible to make changes in the calendar specifications or in the wiring in an imprinting unit. In the data imprinting/recording apparatus for a camera described in item (5) above, data can be readily changed because the storage means is a nonvolatile memory. In the data imprinting/recording apparatus for a camera described in item (6) above, it is readily possible to change the wiring in an imprinting unit. In the data imprinting/recording apparatus for a camera described in item (7) above, the calendar specifications can be easily changed.

According to the present invention, it is possible to arbitrarily set the calendar start year and end year and the imprinting patterns necessary for the calendar function of the imprinting controller. This makes it possible to provide a data imprinting/recording apparatus for a camera, in which not only the calendar specifications or the wiring in an imprinting unit can be readily changed, but also data can be very easily transported to a data imprinting/recording apparatus for another camera.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A data imprinting apparatus for a camera, comprising:
   a main microcomputer for controlling an operation of said camera;
   a data microcomputer having a temporary memory, said data microcomputer controlling imprinting of data onto a surface of a film;
   a communication line for performing communication between said main microcomputer and said data microcomputer;
   imprinting means connected to said data microcomputer and having a plurality of light-emitting segments for respectively forming one numeral, one letter or one symbol, said imprinting means imprinting at least one of a numeral, a character, and a symbol on the surface of said film by combining one or more of said light-emitting segments; and
   an electrically rewritable nonvolatile memory coupled to said main microcomputer for storing pattern data necessary to imprint said at least one of the numeral, the character, and the symbol using said light-emitting segments of said imprinting means,
   wherein said main microcomputer includes means for transmitting the pattern data to said temporary memory in said data microcomputer via said communication line, and
   said data microcomputer includes means for controlling said imprinting means to imprint said at least one of the numeral, the character, and the symbol as data on the surface of said film using the pattern data stored in said temporary memory.

2. An apparatus according to claim 1, further comprising an oscillator for generating clock pulses coupled to said data microcomputer, and wherein said data microcomputer includes date data forming means for forming date data by counting the clock pulses generated by said oscillator.

3. An apparatus according to claim 2, wherein said data microcomputer includes means for controlling said imprinting means to imprint the date data formed by said date data forming means on the surface of said film.

4. An apparatus according to claim 2, wherein:
   said nonvolatile memory includes means for storing date start data indicating a date at which said date data forming means starts counting of the clock pulses generated by said oscillator, and
   said date data forming means includes calculating means for calculating a present date using the date start data stored in said nonvolatile memory and the counted clock pulses generated by said oscillator.

5. An apparatus according to claim 2, further comprising an operating switch coupled to said data microcomputer for modifying the date data or changing a display mode of the date data.

6. An apparatus according to claim 2, wherein:
   said main microcomputer includes means for receiving the date data formed by said data microcomputer via said communication line, and
   a display device for displaying the received date data is coupled to said main microcomputer.

7. A data recording apparatus for a camera, comprising:
   a camera operation control device for controlling an operation of said camera; and
   a data imprinting device including an imprinting unit having a plurality of light-emitting elements for imprinting data on a film,
   said camera operation control device comprising:
      first pattern data storage means for storing pattern data necessary to imprint at least one of a numeral, a character, and a symbol using said light-emitting elements; and
      communication control means for transmitting the pattern data stored in said first pattern data storage means and an imprinting command signal, and
   said data imprinting device comprising:
      second pattern data storage means for temporarily storing the pattern data transmitted by said communication control means; and
      imprinting control means for controlling imprinting of data responsive to the imprinting command signal transmitted by said communication control means and on the basis of the pattern data stored in said second pattern data storage means.

8. An apparatus according to claim 7, wherein:
   said imprinting device includes date data forming means for forming date data, and
   said imprinting control means includes means for controlling imprinting of the date data formed by said date data forming means.

9. An apparatus according to claim 8, wherein:
   said communication control means of said camera operation control device includes means for receiving the date data formed by said date data forming means, and
   said camera operation control device includes display means for displaying the received date data.

10. A data recording apparatus for a camera, comprising:
   recording means having a plurality of recording elements for recording data on a film located in said camera, said recording elements being used to express at least one numeral, one letter or one symbol;

electrically rewritable nonvolatile storage means for storing pattern data necessary to record data using said recording elements of said recording means; and recording control means for controlling data recording on the basis of the pattern data stored in said storage means.

11. An apparatus according to claim 10, further comprising communicating means for communicating pattern data to be stored in said electrically rewritable nonvolatile storage means from an external device coupled to said camera.

12. An apparatus according to claim 10, further comprising date data forming means for forming date data, and wherein said recording control means includes means for controlling recording of the date data formed by said date data forming means.

13. An apparatus according to claim 10, further comprising communicating means for writing the pattern data corresponding to an arrangement of said recording elements in said electrically rewritable nonvolatile memory during manufacture of said camera.

14. A date recording apparatus for a camera, comprising:

a main microcomputer for controlling an operation of said camera;

a data microcomputer for controlling data imprinting;

an oscillator coupled to said data microcomputer for generating clock pulses, said data microcomputer having counting means for counting the clock pulses generated by said oscillator;

an electrically rewritable nonvolatile memory coupled to said main microcomputer for storing calendar data indicating a start year and an end year which represent a formable range of the date data; and a communication line for performing communication between said main microcomputer and said data microcomputer, wherein said main microcomputer includes means for transmitting the calendar data stored in said nonvolatile memory to said data microcomputer via said communication line, said data microcomputer includes means for forming date data using the transmitted calendar data and a count of the clock pulses counted by said counting means, and said date imprinting/recording apparatus further comprises recording means coupled to said data microcomputer for recording the date data formed by said data microcomputer on a surface of a film.

15. An apparatus according to claim 14, wherein said recording means includes a plurality of light-emitting elements and means for imprinting the date data on the surface of said film using a numeral, a character, or a symbol.

16. A date recording apparatus for a camera, comprising:

a camera operation control unit for controlling an operation of said camera; and a date recording unit for recording date data on a film, said camera operation control unit comprising:

first storage means for storing calendar control data indicating a start year and an end year which represent a formable range of the date data; and communication control means for transmitting the calendar control data stored in said first storage means to said date recording unit, and said date recording unit comprising:

second storage means for temporarily storing the calendar control data transmitted by said communication control means;

an oscillator for generating clock pulses;

calendar data forming means for forming calendar data comprising a year, month, and day on the basis of the calendar control data temporarily stored in said second storage means and a count of the clock pulses generated by said oscillator; and date recording means for recording a date corresponding to the calendar data formed by said calendar data forming means.

17. An apparatus according to claim 16, wherein said date recording unit includes modifying means for modifying the calendar data.

18. An apparatus according to claim 16, wherein said date recording unit includes interchanging means for interchanging display orders of the calendar data.

19. An apparatus according to claim 16, wherein said camera operation control unit includes means for receiving the calendar data formed by said calendar data forming means using said communication control means, and display means for displaying the received calendar data.

20. A date recording apparatus for a camera, comprising:

storage means for storing calendar control data indicating a formable range of date data;

calculating means for calculating at least one of a date and time on the basis of the calendar control data stored in said storage means and a clock signal; and data recording means for recording the at least one of the date and time calculated by said calculating means on a film.

21. An apparatus according to claim 20, further comprising communicating means for performing communication between said data recording apparatus and an external device coupled to said camera, and wherein the calendar control data to be stored in said storage means is written in said storage means from the external device via said communicating means.

22. An apparatus according to claim 20, wherein said storage means comprises an electrically rewritable nonvolatile memory for storing the data.

23. A data imprinting/recording apparatus for recording data on a surface of a film, comprising:

data recording means for recording at least one numeral, one letter or one symbol based on a combination of a plurality of recording elements; and communicating means for performing communication between said data imprinting/recording apparatus and an external device; and storage means for storing an output pattern which said data recording means outputs to record the at least one numeral, letter or symbol on the surface of said film, the contents stored in said storage means being rewritable responsive to a communication performed via said communicating means, wherein said data recording means includes means for recording the data on the surface of said film in accordance with the output pattern stored in said storage means.

24. A data recording apparatus for a camera which has calendar control means with a calendar function and data recording means for recording data on a surface of a film, comprising:

communicating means for performing communication between said data imprinting/recording apparatus and an external device; and storage means for storing control data for controlling the calendar function, the contents stored in said storage means being rewritable responsive to a communication performed via said communicating means, wherein said calendar control means includes means for forming date data using the control data stored in said storage means, and said data recording means includes means for recording the data on the surface of said film on the basis of the date data formed by said calendar control means.

* * * * *

UNITED STATES PATENT AND TRADEMARK OFFICE
CERTIFICATE OF CORRECTION

PATENT NO. : 5,649,248
DATED : July 15, 1997
INVENTOR(S) : KOBAYASHI et al.

It is certified that error appears in the above-identified patent and that said Letters Patent is hereby corrected as shown below:

Title page, Item [56], beneath "References Cited" insert:

--U.S. PATENT DOCUMENTS 5,302,990   4/1994   Satoh et al.--

Signed and Sealed this

Tenth Day of February, 1998

*Attest:*

BRUCE LEHMAN

*Attesting Officer*   Commissioner of Patents and Trademarks